United States Patent

Hancke et al.

[15] 3,673,399

[45] June 27, 1972

[54] FFT PROCESSOR WITH UNIQUE ADDRESSING

[72] Inventors: Peter J. Hancke, Apalachin; Monroe Judkovics, Endicott; Robert J. Urquhart, Endwell, all of N.Y.

[73] Assignee: International Business Machines Corporation, Armonk, N.Y.

[22] Filed: May 28, 1970

[21] Appl. No.: 48,624

[52] U.S. Cl. ........................................235/156, 340/172.5

[51] Int. Cl. ........................................................G06f 7/38

[58] Field of Search ........................235/152, 156; 340/172.5

[56] References Cited

UNITED STATES PATENTS 3,517,173 6/1970 Gilmartin, Jr. et al.................235/156

3,544,775 12/1970 Bergland.........................235/156 UX

OTHER PUBLICATIONS

M. C. Pease, Organization of Large Scale Fourier Processors, " J. of Association For Computing Machines" July 1969, pp. 474–82

G. D. Bergland, FFT Hardware Implementations– An Overview " IEEE Trans. an Audio & Electroacoustics" Vol. AU–17, No. 2, June 1969, pp. 104–108

*Primary Examiner*—Eugene G. Botz

*Assistant Examiner*—David H. Malzahn

*Attorney*—Hanifin and Jancin and John S. Gasper

[57] ABSTRACT

A real time digital Fourier analyzer using the Cooley-Tukey algorithm for calculating the Fast Fourier Transform. An arithmetic unit simultaneously performs the two complex calculations $A_r = B_r + W_r C_r$ and $A_{(r+n/2)} = B_r - W_r C_r$. The calculated results are simultaneously stored and retrieved in an in-place operation in dual buffers in successive iterations. Addressing of the buffers uses a single binary address counter and sequential bit complementing for simultaneously addressing both buffers. Parity checking of the binary counter output address controls multiplexing logic to selectively address the buffers to store the calculated results into the desired buffer storage locations.

21 Claims, 11 Drawing Figures

INVENTORS
PETER J. HANCKE
MONROE JUDKOVICS
ROBERT J. URQUHART

BY John S. Gasper
ATTORNEY

FFT PROCESSOR WITH UNIQUE ADDRESSING

CROSS-REFERENCES TO RELATED APPLICATIONS

Application of J. T. Cutter et al., Ser. No. 768,474, filed Oct. 17, 1968, now Pat. No. 3,591,784, entitled "Real Time Digital Fourier Analyzer."

BACKGROUND OF THE INVENTION

1. Field of the Invention

This invention relates to apparatus for measuring and testing electrical waveforms, and more specifically, for generation of storage and retrieval addresses for system constants and data in a digital Fourier analyzer. This invention especially relates to such an analyzer which operates according to the Cooley-Tukey algorithm and an addressing means therefor.

2. Description of the Prior Art

The Cooley-Tuckey algorithm for obtaining the Fourier Transform of a series of digital samples on digital electronic computers has been widely publicized and analyzed. Reference is made to the technical article "What Is the Fast Fourier Transform" of W. T. the IEEE Transactions on Audio and Electronics, Vol. AU-15, No. 2, June 1967, article, "The Fast Fourier Transform" of E. O. Brigham et al. in IEEE Spectrum, et al., in IEEE Spectrum, Dec. 1967. The above-mentioned copending application of Cutter et al describes an early version of a digital processor operable to analyze complex waveforms using a version of the Cooley-Tukey algorithm. As discussed in Cutter et al., the real time digital processor calculates a series of iterations of the equations:

$$A_r = B_r + W_r C_r \text{ and} \quad (1)$$

$$A_{r+n/2} = B_r - W_r C_r \quad (2)$$

where $$W = exp\,[-2\pi j/n].$$

As explained in Cutter et al., the processor uses a single memory device for storing the original and calculated operands $B_r$ and $C_r$ when the Cooley-Tukey algorithm is employed since that algorithm performs an in-place operation, i.e., the newly calculated operands are stored in the same locations of memory from which the preceding operands were withdrawn to obtain the new calculations. The apparent advantage using the Cooley-Tukey algorithm, as described in Cutter et al., was that less memory was required compared to the processor where other algorithms (such as the Danielson-Lancoz) were used since the requirement for re-ordering the operands of the new calculations preceding each iteration required a second memory device. Basically, the digital processor using the Cooley-Tukey algorithm in Cutter et al is a series machine, and operands must be fetched sequentially before computation can occur, which necessarily slows the processing rate. An added factor of the Cutter et al. system requires special arithmetic processes, e.g. premultiplication, to increase processing rates.

SUMMARY OF THE INVENTION

It is an object of the present invention to provide a real time digital fourier analyzer which is inherently a high speed processor.

It is also an object of this invention to provide a real time digital fourier analyzer in which the arithmetic is performed using straightforward simple arithmetic unit logic without special manipulations.

It is also an object of this invention to provide improved address generation for a high speed processor.

In accordance with this invention, the above, as well as other objects, are attained by providing a fourier analyzer having an arithmetic unit capable of simultaneously calculating the above-mentioned equations:

$$A_r = B_r + W_r C_r$$

$$A_{(r+n/2)} = B_r - W_r C_r$$

The computed outputs from the simultaneous calculations of the arithmetic unit are stored in and retrieved from a pair of memory buffers on an "in-place" basis. It is a feature of this invention to provide unique addressing means in which a single binary counter combined with logic for sequentially complementing output bits of the counter is all that is needed to address two buffers such that two operands are available always simultaneously. A parity check of the binary counter output serves to route the computed operands to the correct buffer memory. A read only memory device provides the coefficient ($W_r$) needed to perform the solution. The processor further includes an input buffer and formatting logic adapted to receive the binary input data from an I/O device and to store it in a predetermined format in preparation for the initial iteration of the algorithm. An input switch logic, operated under central timing and control multiplexes data from the input, output, and read only buffers into the arithmetic unit at each iteration or cycle of the processor. It is a further feature of this invention that the fourier analyzer processor overlaps the loading of the input data with the calculation of the operands during the iterations after the first. This overlapping technique makes it possible to simplify the address and gating logic for loading the input buffer. Specifically, the input buffer is comprised of dual storage sections, each section being designed to store one complete set of the system operands ($B_r$ and $C_r$).

The successive sets of operands are gated sequentially into only the first section of the input buffer which is filled completely by one complete set. Gating of the second set of operands into the first section of the input buffer produces an overflow of the first operand set from the first input buffer section to the second section via loopback connections from the output lines of the first section of the input buffer to the input of the second input buffer section. A common binary counter under the control of synchronous timing during initial loading and asynchronous timing during overlap loading provides common simultaneous addressing to common address positions of the input buffer. When all sections of the input buffer have been filled, i.e., all sets of operands have been stored, then, during the predetermined time set by central processor control, two operands are simultaneously read from input buffer with the coefficient $W_r$ from read only memory through the input switch logic to the arithmetic unit for the successive calculations of the initial iteration.

Thus, it will be readily appreciated, that simultaneous calculation of the two algorithms and use of two output buffers for simultaneously storing and withdrawing calculated operands provides an increase in processing rates for a fourier analyzer. In addition, the provision of an input buffer with data formatting in combination with overlap load and calculation provides further increase in processing rates. The use of a single binary counter with sequential complementing of counter output bits provides a relatively simple and reliable approach to assuring simultaneous addressing of the dual output buffers thereby assuring simultaneous availability of dual operands for the calculations. The use of parity checking in combination with multiplexing logic to select output buffer storage further provides an effective, reliable, and relatively simple design for storage selection.

The foregoing and other objects, features and advantages of the invention will be apparent from the following more particular description of a preferred embodiment of the invention as illustrated in the accompanying drawings.

DESCRIPTION OF A PREFERRED EMBODIMENT

GENERAL DESCRIPTION AND OPERATION

Figure 1:
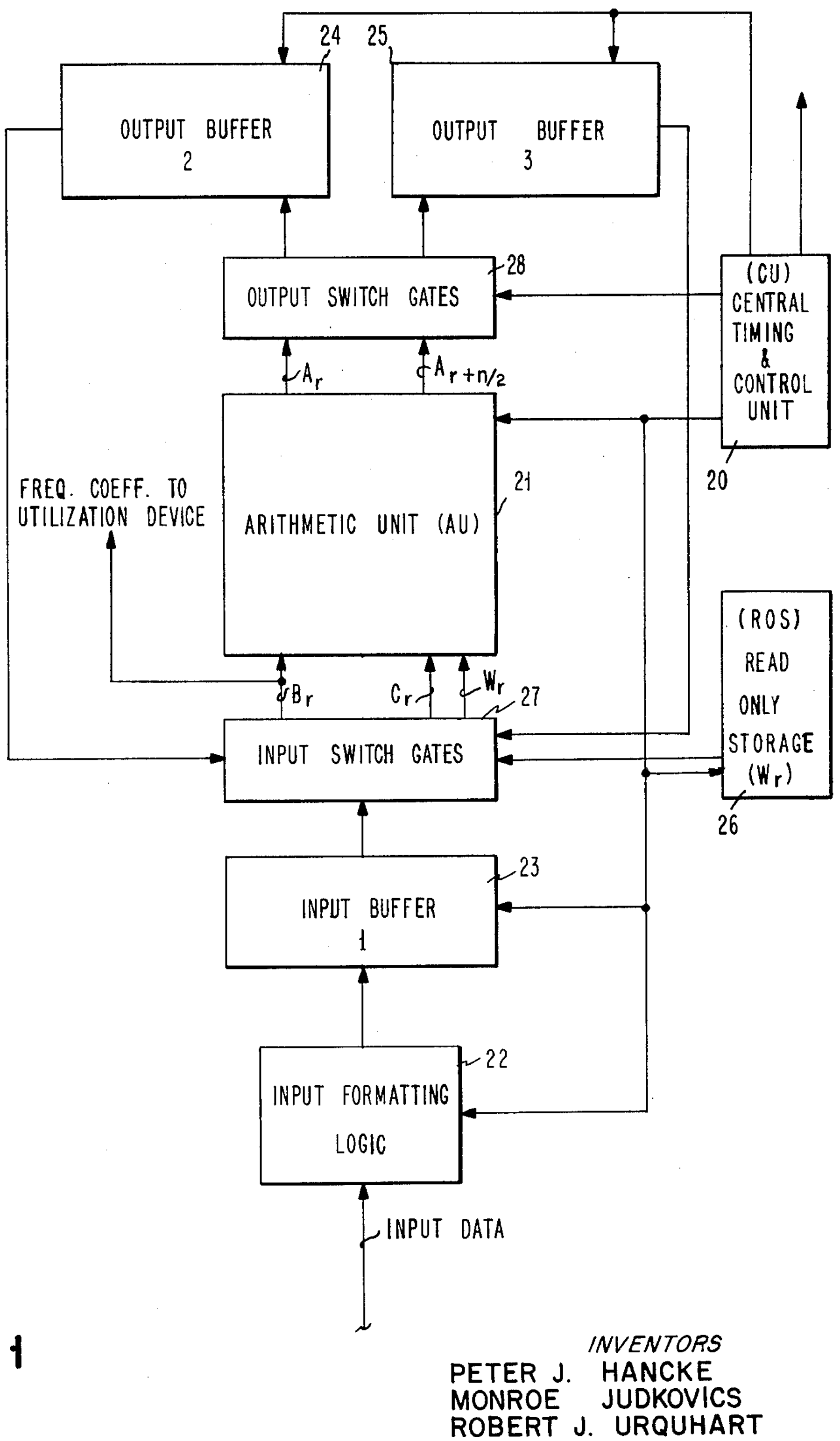
FIG. 1 is a general schematic logic diagram of the Fast Fourier Transform processor of the present invention.

The high speed Fast Fourier Transform (FFT) processor, as shown in FIG. 1, is a digital processor designed to calculate the discrete Fourier transform of n time samples. The basic FFT computation consists of simultaneously performing the following two operations:

$$A_r = B_r + W_r C_r \qquad (1)$$

and $$A_{r+n/2} = B_r - W_r C_r \qquad (2)$$

where $A_r$, $B_r$, $W_r$, and $C_r$ are complex numbers. The mathematics for the FFT is well known in the art and further details of the mathematical algorithm and its manipulation is readily understood by reference to the previously mentioned copending application of Cutter et al and the articles of Cochran et al. and Brigham et al. As shown in FIG. 1, the processor comprises the following generally defined logical units:

A. Central timing and control unit 20, which contains the basic timing source for the processor, the address generators and control signals to sequence the processor through the calculations shown in Equations (1) and (2).

B. Arithmetic Unit (AU) 21 which simultaneously performs the two complex calculations of Equations (1) and (2).

C. Input formatting logic 22 which receives analog input data from I/O devices of well-known type external to the processor and converts it to digital data in real and imaginary form in predetermined sequence for processing by the processor.

D. Input buffer 23 to store converted digital input data.

E. Output buffers 24 and 25 which store the operands calculated by arithmetic unit (AU) 21.

F. Read only store (ROS) 26 which contains n/4 roots of unity ($W_r$) needed to perform the FFT.

G. Input switch gates 27 which receive input data on the first pass of data from the input buffer 23, calculated operand data from output buffers 24 and 25, and roots of unity coefficients from ROS 26 and, under control of CU 20, gates them to the arithmetic unit 21 for the simultaneous calculations of Equations (1) and (2).

H. Output Switching Logic gates 28 receives calculated data from (AU) 21 and gates it to the predetermined storage locations of buffers 24 and 25 under control of the timing, control and address signals of the CU 20. In general, the processor of FIG. 1 basically has three operational modes, namely, loading, processing, and read out, plus a startup mode. In startup, analog data from a wave analyzer I/O device is supplied to the input formatting logic 22 for conversion to digital data sample form of the operands $B_r$ and $C_r$. The $B_r$ and $C_r$ operands are then stored in operand pairs at each storage location of the input buffer 23. These samples are stored in the correct format as shown for Pass 1 of the algorithm as shown in the following table, using $n = 32$ samples:

TABLE I

| PASS 1 | PASS 2 | PASS 3 |
|---|---|---|
| OP. - OP16 | OP0 - OP8 | OP0 - OP4 |
| OP1 - OP17 | OP1 - OP9 | OP1 - OP5 |
| OP2 - OP18 | OP2 - OP10 | OP2 - OP6 |
| OP3 - OP19 | OP3 - OP11 | OP3 - OP7 |
| OP4 - OP20 | OP4 - OP12 | OP8 - OP12 |
| OP5 - OP21 | OP5 - OP13 | OP9 - OP13 |
| OP6 - OP22 | OP6 - OP14 | OP10 - OP14 |
| OP7 - OP23 | OP7 - OP15 | OP11 - OP15 |
| OP8 - OP24 | OP16 - OP24 | OP16 - OP20 |
| OP9 - OP25 | OP17 - OP25 | OP17 - OP21 |
| OP10 - OP26 | OP18 - OP26 | OP18 - OP22 |
| OP11 - OP27 | OP19 - OP27 | OP19 - OP23 |
| OP12 - OP28 | OP20 - OP28 | OP24 - OP28 |
| OP13 - OP29 | OP21 - OP29 | OP25 - OP29 |
| OP14 - OP30 | OP22 - OP30 | OP26 - OP30 |
| OP15 - OP31 | OP23 - OP31 | OP27 - OP31 |

| PASS 4 | PASS 5 (LP) |
|---|---|
| OP0 - OP2 | OP0 - OP1 |
| OP1 - OP3 | OP2 - OP3 |
| OP4 - OP6 | OP4 - OP5 |
| OP5 - OP7 | OP6 - OP7 |
| OP8 - OP10 | OP8 - OP9 |
| OP9 - OP11 | OP10 - OP11 |
| OP12 - OP14 | OP12 - OP13 |
| OP13 - OP15 | OP14 - OP15 |
| OP16 - OP18 | OP16 - OP17 |
| OP17 - OP19 | OP18 - OP19 |
| OP20 - OP22 | OP20 - OP21 |
| OP21 - OP23 | OP22 - OP23 |
| OP24 - OP26 | OP24 - OP25 |
| OP25 - OP27 | OP26 - OP27 |
| OP28 - OP27 | OP28 - OP29 |
| OP29 - OP31 | OP30 - OP31 |

Sample operand pairs are read in columnar sequence shown in Table I from input buffer 23 in synchronization with a read operation of ROS 26 for the correct unity coefficients $W_r$ into Input Switch gates 27. After each read operation, the operand pair is clocked into AU 21 with the $W_r$ coefficient from ROS 26 where $A_r$ and $A_{r+n/2}$ are simultaneously computed in the mathematical sequence of operations shown for Pass 1 of FIG. 9. (As shown in that figure, the solid arrow indicates multiplication while the broken arrow signifies the addition operation.) The computer operands $A_r$ and $A_{r+n/2}$ are then placed into output buffers 24 and 25 by output switching logic 28 and CU20 in the order shown in the following Table:

TABLE II

| Buffer 25 | Buffer 24 | Frequency Coefficient | Memory Location |
|---|---|---|---|
| | OP0 | f0 | |
| OP1 | | f16 | 0 0 0 0 |
| OP2 | | f8 | |
| | OP3 | f24 | 0 0 0 1 |
| OP4 | | f4 | |
| | OP5 | f20 | 0 0 1 0 |
| | OP6 | f12 | |
| OP7 | | f28 | 0 0 1 1 |
| OP8 | | f2 | |
| | OP9 | f18 | 0 1 0 0 |
| | OP10 | f10 | |
| OP11 | | f26 | 0 1 0 1 |
| | OP12 | f6 | |
| OP13 | | f22 | 0 1 1 0 |
| OP14 | | f14 | |
| | OP15 | f30 | 0 1 1 1 |
| OP16 | | f1 | |
| | OP17 | f17 | 1 0 0 0 |
| | OP18 | f9 | |
| OP19 | | f25 | 1 0 0 1 |
| | OP20 | f5 | |
| OP21 | | f21 | 1 0 1 0 |
| OP22 | | f13 | |
| | OP23 | f29 | 1 0 1 1 |
| | OP24 | f3 | |
| OP25 | | f19 | 1 1 0 0 |
| OP26 | | f11 | |
| | OP27 | f27 | 1 1 0 1 |
| OP28 | | f7 | |
| | OP29 | f23 | 1 1 1 0 |
| | OP30 | f15 | |
| OP31 | | f31 | 1 1 1 1 |

Figure 2:
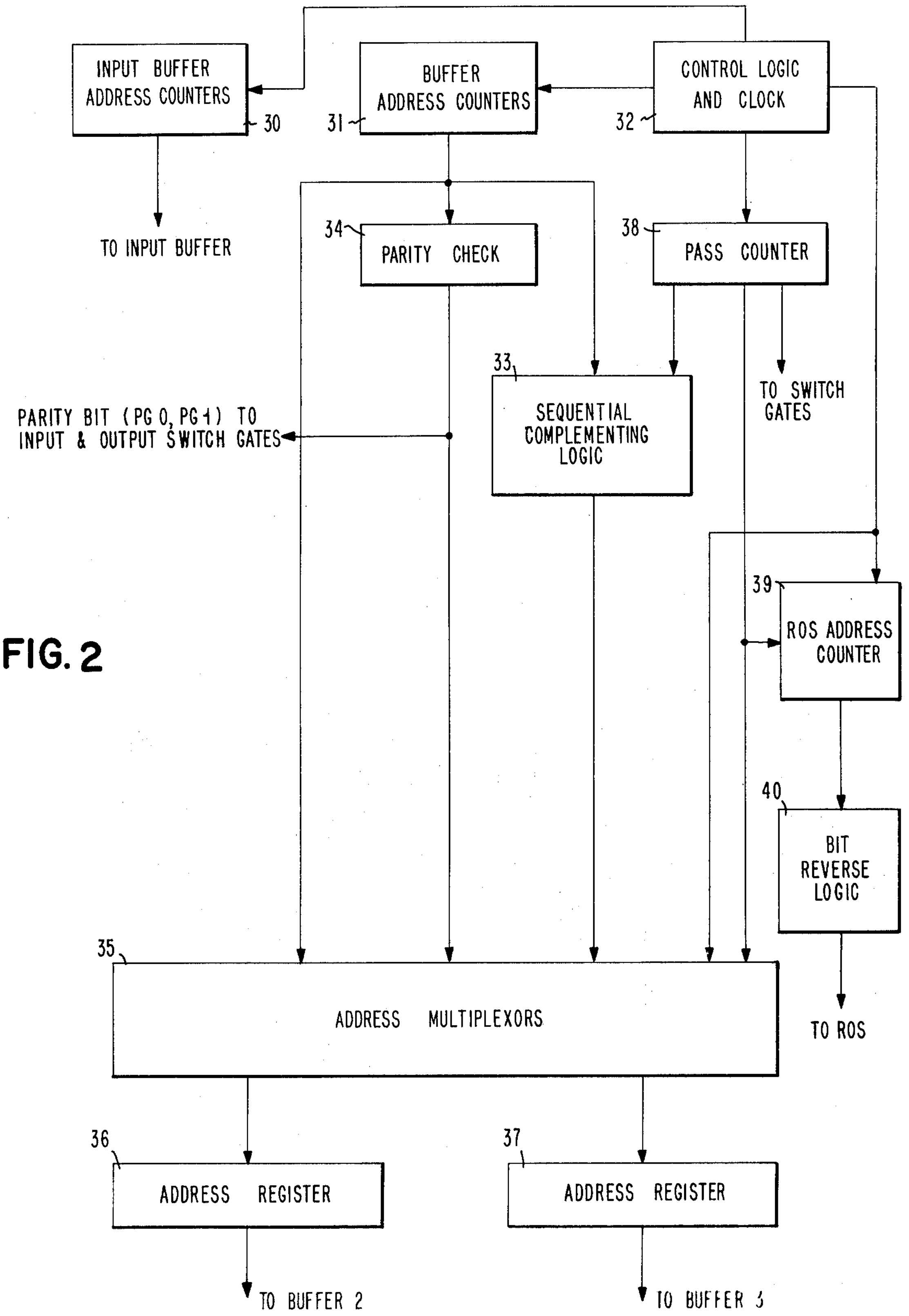
FIG. 2 is a general logic diagram of the addressing system of the control unit of FIG. 1.

The details of the addressing mechanism of the present invention will be described hereinafter; however, in general, as shown in FIG. 2, the address generation means comprises input buffer counter 30, for addressing input buffer 23, and output buffer address counters 31, for selectively and sequentially addressing output buffers 24 and 25. Output buffer addressing further includes sequential complementing logic 33 and a parity check 34 which, in combination, generate dual addresses through an address multiplexor 35 to address registers 36 and 37 to output buffers 24 and 25. The parity check 34 of the address of the output buffers address counters 31 serves to route the operands of $A_r$ and $A_{r+n/2}$ to the correct output buffer as a function of the pass and mode of operation of the processor. Basically, if the parity check is even, $A_r$ is switched to output buffer 24 and $A_{r+n/2}$ is switched to output buffer 25. If odd parity is obtained, the reverse switching of the address multiplexor 35 occurs. Parity checking is also used to obtain an ordered read out of the frequency coefficients from buffers 24 and 25 in the read out mode. As shown in Table II, operand OP0 under control of buffer address counters 31, sequential complementing logic 33 and parity check 34 is placed in location 0 0 0 0 of output buffer 24 and operand OP16 is placed in location 1 0 0 0 of output buffer 25. As will be more fully explained hereinafter, this address generation during an operation is based on the use of straightforward binary counter. Also, as shown in Table II, by switching the output of the parity check, the operand OP1 is placed in location 0 0 0 0 of output buffer 25 and its pared operand OP17 is placed in location 1 0 0 0 of output buffer 24. Thus, using parity check 34, two operand pairs may be stored into the output buffers 24 and 25 for each address generated by a single count of the buffer address counter 31. With storage of operands OP0 – OP32 as shown in Table II, the loading mode operation (i.e., Pass I) of the processor is completed and the processing mode begins.

The processing mode, in the example illustrated, comprises Passes 2, 3, 4, and 5 (or the last pass). Table II shows the order of the operand pairs as they are simultaneously read out of output buffers 24 and 25 in synchronization with coefficients $W_r$ under control of the control logic and clock 22, and a pass counter 38 from ROS 26 through input switching gates 27 into AU 21 where a further iteration of the $A_r$ and $A_{r+n/2}$ are simultaneously computed and restored "in place" in output buffers 24 and 25.

The binary addresses of the binary counter 31 and the complement addresses of the complementing logic 33 as a function of output of pass counter 38 for the sequence of operands desired for Passes 1–5 is shown in the following Table:

TABLE III

| OUTPUT OF BINARY CTR. | OUTPUT OF SEQUENTIAL COMPLEMENTING LOGIC | PASS |
|---|---|---|
| $a_3a_2a_1a_0$ | | |
| 0000 – (0) | 1000 – 8 | 1 |
| 0001 – (1) | 1001 – 9 | |
| 0010 | 1010 | |
| 0011 | 1011 | |
| 0100 | 1100 | |
| 0101 | 1101 | |
| 0110 | 1110 | |
| 0111 | 1111 | |
| 1000 | 0000 | |
| 1001 | 0001 | |
| 1010 | 0010 | |
| 1011 | 0011 | |
| 1100 | 0100 | |
| 1101 | 0101 | |
| 1110 | 0110 | |
| 1111 | 0111 | |
| 0000 | 0100 | 2 |
| 0001 | 0101 | |
| 0010 | 0110 | |
| 0011 | 0111 | |
| 0100 | 0000 | |
| 0101 | 0001 | |
| 0110 | 0010 | |
| 0110 | 0010 | |
| 0111 | 0011 | |
| 1000 | 1100 | |
| 1001 | 1101 | |
| 1010 | 1110 | |
| 1011 | 1111 | |
| 1100 | 1011 | |
| 1101 | 1001 | |
| 1110 | 1010 | |
| 1111 | 1011 | |
| $a_3a_2a_1a_0$ | $a_3a_2a_1a_0$ | 3 |
| $a_3a_2a_1a_0$ | $a_3a_2a_1a_0$ | 4 |
| $a_3a_2a_1a_0$ | $a_3a_2a_1a_0$ | 5 |

From this table it will be seen that the buffer address counters 31 count sequentially in ascending order while the complementing logic 33 complements sequentially in descending order beginning with the most significant bit (MSB) an descending in order to the lease significant bit (LSB) through Pass 4. In Pass 5, the complementing logic 33 is inactive.

Pass counter 38 keeps track of which bit is to be complemented as well as controlling the input and output switching gates 27 and 28 for switching the operands to the $B_r$ and $C_r$ inputs to AU 21 and to buffers 24 and 25. During Pass 2–4 of the process mode the output buffer address counters 31, sequential complementing logic 33, in combination with the input and output switch gates 27 and 28 functions as a crossbar switch routing data from output buffers 24 and 25 to the correct $B_r$ and $C_r$ inputs of AU 21 input in accordance with Table I and FIG. 9. Also, during Pass 2–4 of the processing mode, the output switch gates 28 under control of ROS address logic function as a crossbar switch routing data from the two outputs of the AU 21 i.e., $A_r$ and $A_{r+n/2}$) to the output buffers 24 and 25. In the last pass (i.e., Pass 5) of the processing mode, the parity check 34 again acts to control input and output switch gates to route operand pairs through input switch gate 27 and output switch gates 28, respectively, to AU 21 and output buffers 24 and 25.

Synchronized with each read operation of buffers 24 and 25 is a read operation of the ROS 26 to obtain the coefficient $W_r$. The $n/4$ roots of unity [$W_r$] are ordered in the ROS 26 on their exponent. Thus, $W^0$ is stored in location 0 0 0 0 and $W^8$ is stored in location 1 0 0 0 of ROS 26. With this storage arrangement, ROS address counter 39 and bit reverse logic 40 serve as the address to ROS 26. The sequence of address to read out the roots of unity from ROS 26 with proper sign is shown in detail in FIG. 9. As set forth in that figure, the ROS address counter 39 is incremented every $n/2^P$ operations to provide the correct coefficient where $n$ = No. of operands and $P$ = Pass No.

During the last pass (LP) [i.e., P5], as shown in Table I, the parity check on the output of address counter serves to control the input and output switch gates 27 and 28. Since the sequential complementing logic is inactive, when address 0 0 0 0 is generated by the output buffer counter 31, that position is addressed in both buffers 24 and 25. Thus, OP0 and OP1 are read out. The parity of that address is even, therefore, a PG1 pulse to input with gate 28 switches OP0 (buffer 24) to the $B_r$ input of AU 21 and OP1 (buffer 25) is switched to $C_r$ input of AU 21. When address 0 0 0 1 is addressed in both buffers 24 and 25, as shown in Table II, OP2 and OP3 are read out. Since the parity of this address is odd, OP3 in buffer 24 is switched to the $C_r$ input of AU 21 and OP2 in buffer 25 is switched to the $B_r$ input of AU 21. The same address sequence procedure is applied to the output switch gates 28 to thereby assure the storage of the correct computed operands in the locations from which they were retrieved.

After the processing mode is complete, the read out mode is initiated. From Table III, as it will be described more fully hereinafter, the frequency coefficients ($f_0$ – $f_{31}$) have been stored at the end of LP in a way in which they can be read out by bit reversing the output of the binary address counter 31. Using bit reversal of buffer address counter 31 during read out, the frequency coefficients from buffers 24 and 25 under control logic and clock 32 are read out in ascending order to an external utilization device through input switch gates 27. During read out mode, further sample data for waveform analysis is processed through input formatting logic 22 to input buffer 23 in preparation for repeating the process mode described. Further details of the operations just described are set forth in the succeeding sections that follow.

TIMING AND CONTROL

Figure 4:
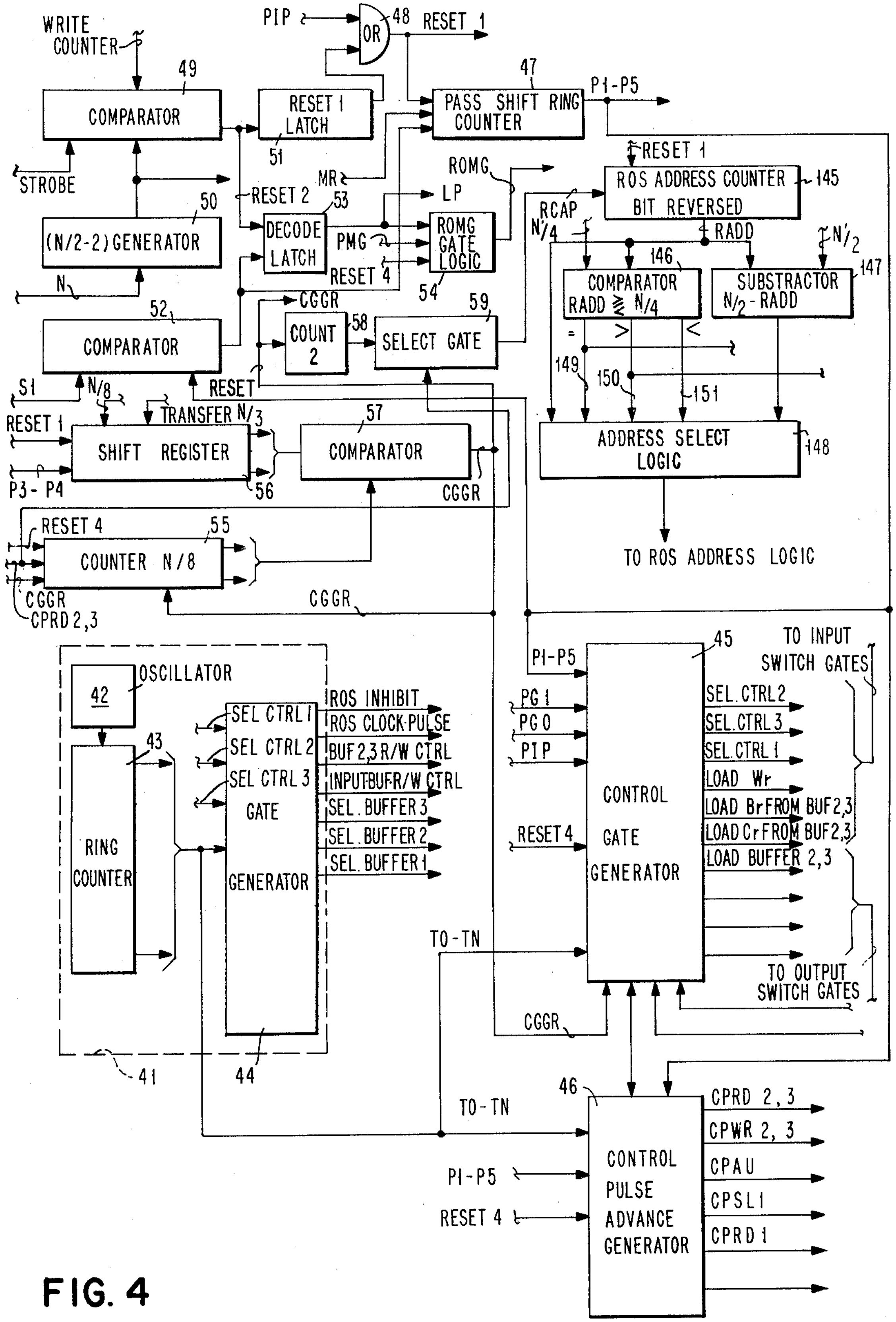
FIG. 4 is a logic diagram of the control unit showing additional details of the timing and control unit of FIG. 1.

Details of various portions of central timing and control unit 20 are seen in FIG. 4. Synchronous timing for operating the processor is provided by a clock 41 comprising an oscillator 42 and a ring counter 43. The oscillator 42, which is preferably a crystal oscillator, and the ring counter 43 which is preferably a switch tail ring counter operate in well-known manner in which the oscillator 42 is counted down in ring counter fashion to form plural timing pulses TO-TN . In the preferred embodiment, the timing pulses TO-TN are contiguous, non-overlapping pulses of uniform pulse width. The output of ring counter 43 is connected to gate generator 44, control gate generator 45, and control pulse advance generator 46, to generate the timing and various control signals used throughout the processor. Timing pulses TO-TN applied to gate generator 44 in combination with selection control signals (Sel. CTRL 1, 2, and 3) generate control pulses for buffer selection (Sel. Buffer 1, 2, 3), buffer read/write control, (Buffer 2, 3 R/W CTRL, Input Buffer R/W CTRL) and ROS clock and ROS Inhibit pulses. Timing pulses TO-TN supplied to control gate generator 45 in combination with pass counter pulses (P1–P5) and parity check pulses (PG1, PG0) generate the selection control gate pulses (Sel. CTRL 1, 2, 3) the load gate pulses of operand data (Load $B_r$ from Buffer 2, 3, Load $C_r$ from buffers 2 and 3 and the load gate pulses (Load $W_r$) of unity coefficient data $W_r$ into the input switching logic 27 as well as load gate pulses (Load Buffer 2, 3) to the output switch logic 28 for loading computed data $A_r$ and $A_{r+n/2}$ from AU 21 to output buffers 24 and 25.

Timing pulses TO-TN applied to input of control pulse advance generator 46 in combination with pass gate pulses P1–P5 generate read/write clock pulses (CPRD 2, 3; CPWR 2, 3) for buffers 24 and 25, and calculate pulses (CPAU) for arithmetic unit 21, and read out clock pulses (CPRD) for reading $B_r$ and $C_r$ operands from input buffer 23. In the interest of simplicity, the detail logic circuits of gate generator 44, control gate generator 45, and control pulse advance generator 46 are omitted. Basically, the functional elements are logic combinations of AND, OR type logic elements designed to generate output pulses when various combinations of enable pulses of the type described are applied to their respective inputs.

As shown in FIGURE 4, central control unit 20 also includes pass gate logic for generating pass gating pulses P1–P5 and pass control pulses LP and ROMG. The pass gating pulses P1–P5 are used to control the sequential complementing logic 33 for address modification to buffers 24 and 25, the control gate generator 45, and the control pulse advance generator 46. The pass gate logic basically comprises a multistage pass shift ring counter 47 which is incrementally advanced by reset 1 pulse from OR gate 48 at the completion of the sequence of operations of each pass which occurs upon the completion of storage of complete data sample set in buffers 24 and 25. Pass counter timing is initiated by a master reset MR signal at the end of pass 1 which puts the pass counter in P2 state. A digital comparator 49 compares write address counter bits (see FIG. 3) for buffer 24 and 25 with $n/2=2$ from $n/2-2$ generator 50 where n is the product of samples and range gates to be processed. When the write address counter input exceeds $n/2-2$, a Reset 1 signal is generated by reset latch 51 to step passshift counter 47 one count to state P3. A second comparator 52 compares the number of samples 51 to be processed with the output of the pass counter 47. When the last pass (P5) is decoded, comparator 52 generates a Reset 2 signal which resets pass counter 47 to Pass 1 state. The Reset 2 output of comparator 52 also operates decode latch 53 to generate a last pass gate pulse LP. At the end of last pass, a read out mode gate pulse ROMG is generated by ROMG logic 54. On generation of ROMG, address multiplexors 71 and 72 (FIG. 3) are gated for reading data out of buffers 24 and 25 in ordered fashion, as previously discussed. PMG is a control gate pulse which is a logic "one" from pass P2 to pass LP–1 the read out mode is completed and indicates the end of the problem. If input buffer 23 has been loaded with a complete set of samples, and a Reset 4 signal has been generated, a pass one initiate signal (PIP) is generated. This signal PIP switches OR gate 48 to generate a Reset 1 signal to step shift counter 47 to P1 state to start cycle over again The Reset 4 signal also is gated to the control pulse advance generator 46 and clock pulses CPAU for the arithmetic unit AU 21 are then generated in timed sequence to stream the data through AU (see FIG. 5) for storage in buffers 24 and 25.

INPUT FORMATTING LOGIC

Figure 6:
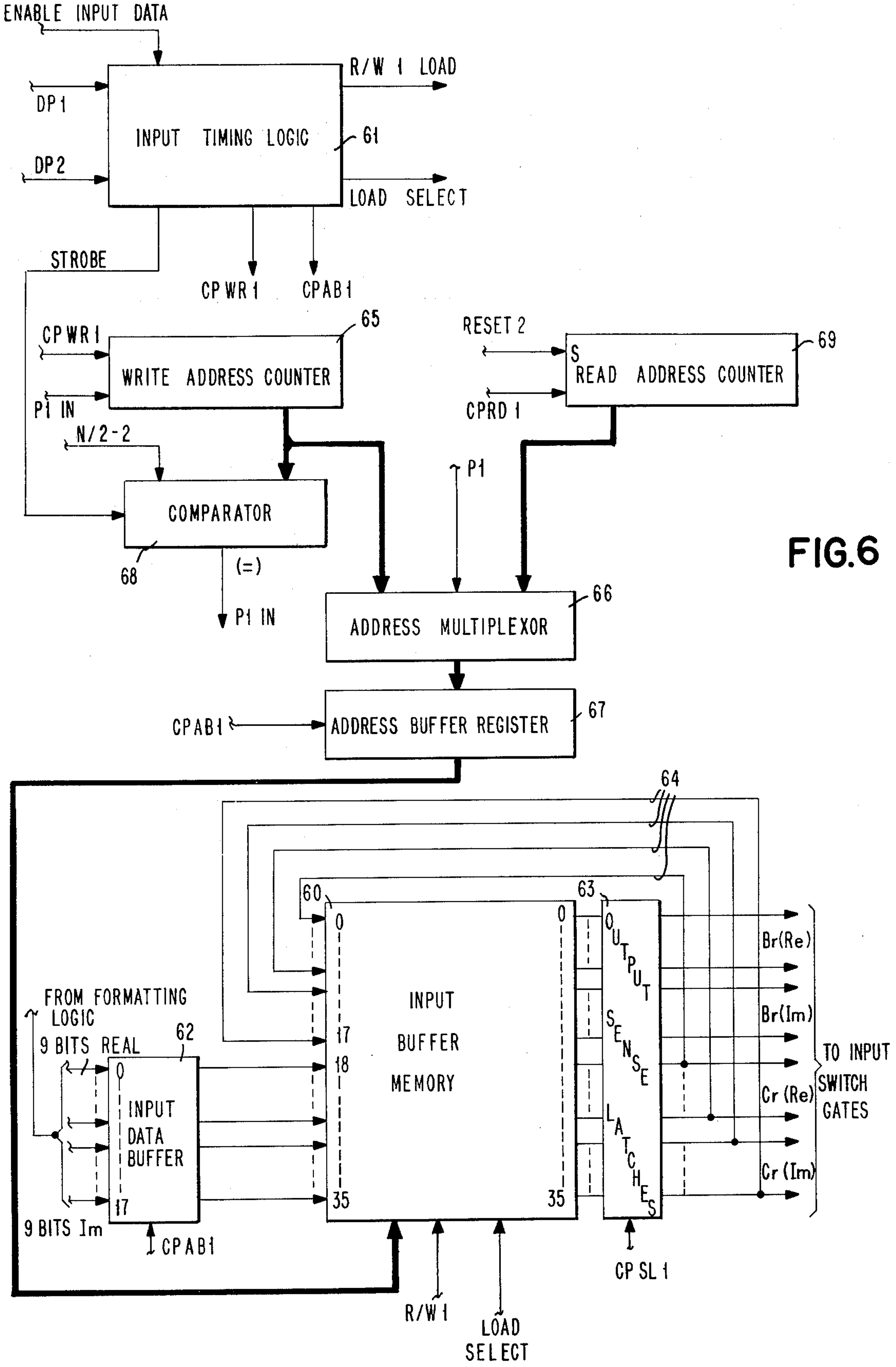
FIG. 6 is a detail schematic logic diagram of the input buffer with timing and addressing logic.
Figure 7:
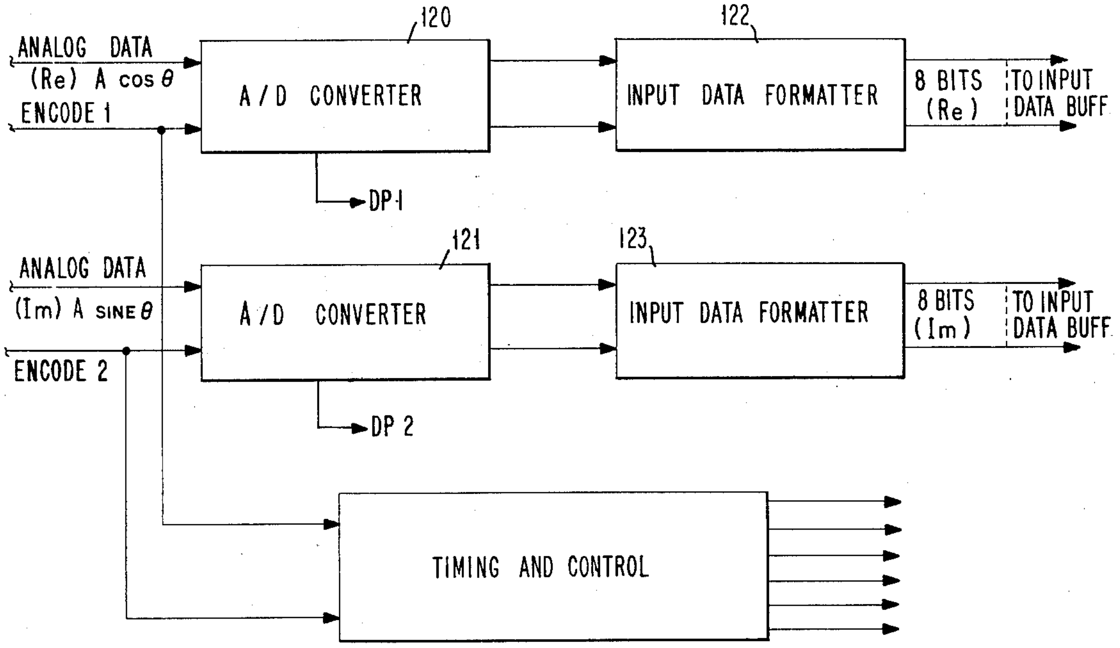
FIG. 7 is a detail logic diagram of the formatting logic of FIG. 1.

As shown in FIG. 7, the input formatting logic comprises A/D converters 120 and 121 having inputs connected to external devices for receiving analog waveform data and outputs connected to input data formatting 122 and 123, which in turn have outputs connected to input data buffer 62 of the input buffer 23 in FIG. 1. Encode 1 and Encode 2 signals from external control gate the analog data to converters 120 and 121, respectively, wherein the analog signals are converted to binary form. Input data formatters take the binary output signals sign and magnitude rearrange the bits to make them compatible with sign and magnitude requirements of the arithmetic unit AU 21 although this may not be necessary as a separate operation but could be included in the A/D converters 122 and 123. DP1 and DP2 signals produced by the A/D converters 120 and 121 are applied to the input timing logic 61 (FIG. 6) to start generation of timing and control pulses for loading formatted binary data into the input data buffer 62 and the input buffer memory 60 as the analog data is received, converted and formatted. As previously discussed, the $B_r$ operand data is supplied to input buffer 62, then the $C_r$ operand data. Thus, in a first cycle, the encode 1 and 2 signals are applied to gate analog data samples to A/D converter 120 and 121 until all $B_r$ operands have been gated through input data buffer 62 by CPAB1 pulses from input timing logic 61 and written into input buffer memory 60. Then encode 1 and 2 signals gate $C_r$ operand data through A/D converter 120 and 121, formatter 123, and into input data buffer 62 for storage, as previously described.

ARITHMETIC UNIT LOGIC

Figure 5:
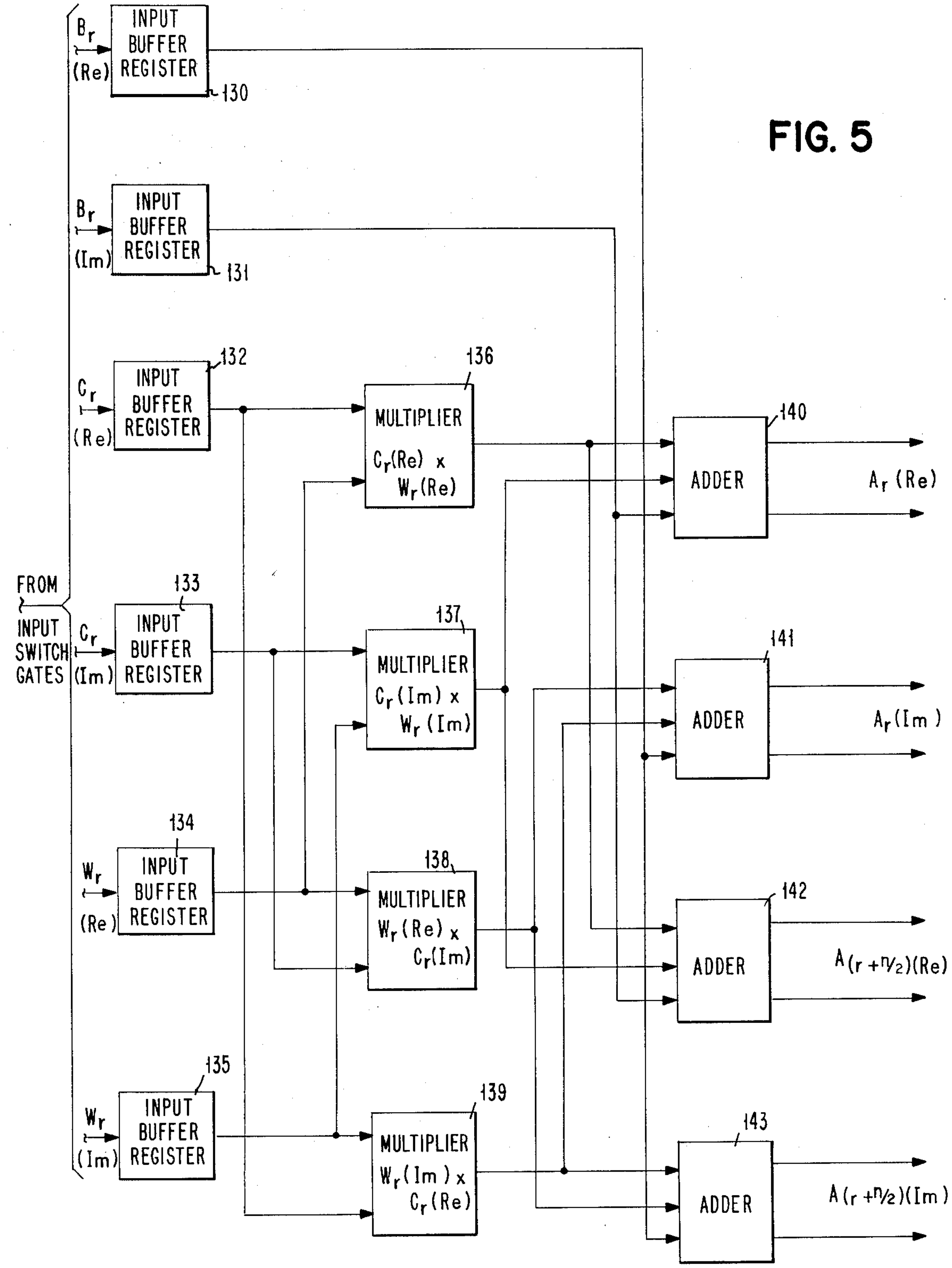
FIG. 5 is a logic diagram of the arithmetic unit of FIG. 1.

An arithmetic unit for performing the simultaneous calculations of equations (1) and (2) is shown schematically in FIG. 5. Basically, the arithmetic unit comprises a set of input buffer registers 130–135 for storing operand ($B_r$ and $C_r$) and coefficient ($W_r$) data coming from the input switch gates 27. Separate input registers are provided for the real and imaginary portions of each of the operands and the unity coefficient. Specifically, input buffer registers 130 and 131 store $B_r$ real and $B_r$ imaginary; registers 132 and 133 store $C_r$ real and $C_r$ imaginary; and registers 134 and 135 store $W_r$ real and $W_r$ imaginary, respectively.

As more fully set out in the previously referenced publications and copending application, the mathematics of the algorithm requires cross multiplication of the real and imaginary functions of the $C_r$ operands and the unity coefficients. For this purpose, input buffers 132 and 134 are connected to inputs of multiplier 136 to perform the binary multiplication of $C_r$ and $W_r$ real. Likewise, input buffers 133 and 135 are connected to inputs of multiplier 137 which performs a multiplication $C_r$ (Im) × $W_r$ (Im). Input register 132 is also connected along with input register 135 to the multiplier 139 to perform the $C_r$ (Re) × $W_r$ (Im) calculation while input register 133 and input register 134 are also connected to multiplier 138 to calculate the product of $C_r$ (Im) × $W_r$ (Re). Specific details of the multipliers are omitted for purpose of simplifying the description since multipliers for performing this type of multiplication are well known in the art.

The products of the multiplier 136–139 are then added and subtracted from the $B_r$ operands to produce $A_r$ and $A_{r+n/2}$. Thus, input register 130 for $B_r$ real is connected along with multiplier 138 and multiplier 139 to adder 141 to perform the calculation of adding $B_r$ (Re) + $C_r$ (Im) × $W_r$ (Re) to obtain the $A_r$ (Im) portion of $A_r$. Input buffer register 131 is connected to adder 140 along with multiplier 136 and multiplier 137 to perform the calculation of adding $B_r$ (Im) + $C_r$ (Re) × $W_r$ (Re) + $C_r$ (Im) × $W_r$ (Im) to obtain the $A_r$ (Re) portion of $A_r$. In the same manner, the real portion of $A_{r+n/2}$ is obtained by connecting input register 131 also to adder 142 with multipliers 136 and 137, and the imaginary portion of $A_{r+n/2}$ is obtained by connecting input register 131 also to adder 142 with multipliers 136 and 137. In the case of adders 142 and 143, as seen by reference to equations (2) as well as FIG. 9, a negative addition is performed. Consequently, adder 143 performs the subtraction $B_r$ (Re) − [$C_r$ (Re) × $W_r$ (Im) + $C_r$ (Im) × $W_r$ (Re)] to obtain the imaginary of $A_{r+n/2}$ while adder 142 performs the subtraction $B_r$ (Im) − [$C_r$ (Re) × $W_r$ (Re) + $C_r$ (Im) × $W_r$ (Im)] to obtain the real part of $A_{r+n/2}$. The outputs of adders 140–143 are connected to output the switch gates 28 for switching into buffers 24 and 25 for further storage and processing. Details of the adders 140–143 for performing the respective additions are omitted since such adders for performing positive and negative addition with provision for carry and sign determining functions as well as other operations are well known in the art. Timing, as well as control pulses for reading data from input buffer 23, and output buffers 24 and 25 through input switch gates 27 to perform the iterations of the algorithm for the various passes as shown in the Tables are generated by the ring counter 43 of clock 41 connected to control pulse advance generator 46 which provides CPAU pulses in timed relation with the flow of data from the input registers 130–135 to the multipliers 136–139 and adders 140–143 in well-known manner.

INPUT BUFFER AND ADDRESS LOGIC

As shown in FIG. 6, the input buffer 23 of FIG. 1 comprises an input buffer memory 60 designed to store two operands ($B_r$ and $C_r$) at each memory location, as shown hereinafter in Table IV. Operands are gated by CPAB1 pluses from input timing logic 61 from input data buffer 62 into memory 60. A first set $B_r$ of $n/2$ operands is gated into half (e.g., bits 18–35) of the input buffer memory 60 until it is filled with the $B_r$ $n/2$ operands. A second set ($C_r$) of $n/2$ operands is then written into the same first half of the buffer memory 60 while the stored first set of $n/2$ operands is read out through output sense latches 63 on loop lines 64 and rewritten into the second half section (e.g., bits 0–17) of the memory 60. For writing, buffer memory 60 is addressed by the output of a binary write address counter 65 gated through address multiplexor 66 to an address buffer register 67 and clocked by CPABI pulses from Input Timing Logic 61 to memory drivers (not shown) associated with buffer memory 60. The condition (P1-NOT) gates the write address to address multiplexor 66 from counter 65 through address multiplexor 66. Write address counter 65 is preferably a ripple counter operated by an asynchronous write pulse CPWRI which is generated by input timing logic as a function of the data present signals (DPI and DP2) generated by the A/D converters of the formatting logic 22 (see FIG. 7).

As seen in FIG. 6, the first $n/2$ operands are written into the first $n/2$ memory locations (bits 18–35). A P1 pulse from comparator 68 is generated when the output of write address counter 65 equals the $n/2 - 2$ input from external control to not the write counter 64 to zero count. A DP2 gate starts input timing logic 61 and a second $n/2$ operands are then written into the first $n/2$ memory locations (bits 17–35). At the same time, the first n/2 operands are read out by CPSL1 pulses from Control Pulse applied to output sense latches 63 and written back on loop lines 64 into bits 0–17 of the first $n/2$ memory locations. Since write address counter 65 addresses all 36 bits of each memory location, in this manner it is possible to load $n$−18 bit operands in $n/2$ − 36 bit memory locations. The following Table shows the operand data storage condition when input buffer memory is completely filled:

TABLE IV

| MEMORY LOCATION | OPERANDS |
|---|---|
| 0 0 0 0 − 0 | OP0, OP16 |
| 0 0 0 1 − 1 | OP1, OP17 |
| 0 0 1 0 − 2 | OP2, OP18 |
| 0 0 1 1 − 3 | OP3, OP19 |
| 0 1 0 0 − 4 | OP4, OP20 |
| 0 1 0 1 − 5 | OP5, OP21 |
| 0 1 1 0 − 6 | OP6, OP22 |
| 0 1 1 1 − 7 | OP7, OP23 |
| 1 0 0 0 − 8 | OP8, OP24 |
| 1 0 0 1 − 9 | OP9, OP25 |
| 1 0 1 0 − 10 | OP10, OP26 |
| 1 0 1 1 − 11 | OP11, OP27 |
| 1 1 0 0 − 12 | OP12, OP28 |
| 1 1 0 1 − 13 | OP13, OP29 |
| 1 1 1 0 − 14 | OP14, OP30 |
| 1 1 1 1 − 15 | OP15, OP31 |

During Pass 1, of the processing mode, data is read from input buffer memory 60 by the single binary read address counter 69 incremented for each read operation to address each memory location of the input buffer memory 60. Thus, when memory location 0 0 0 0 is addressed, operands OP0 and OP16 are read out by R/W1 and load select pulses applied from timing logic 61, to input buffer memory drivers, and a CPSL1 pulse gate applied from control pulse advance generator 46 to the output sense latches 63 transmits the operands as shown in FIG. 6 to the input switch gates logic 27 for gating into AU 21 (see FIG. 1). Of course, as previously stated, each read operation of input buffer memory 60 is synchronized by gate generator 44 and control gate generator 45 to perform a read operation of ROS 26 for the correct coefficient $W_r$. After each read operation from input buffer memory 60 the operands $B_r$ and $C_r$ are clocked into the AU 21 where the first set of operands $A_r$ and $A_{r+n/2}$ are computed. The computed operands $A_r$ and $A_{r+n/2}$ are then gated through output switch gates 28 and placed in output buffers 24 and 25, as shown in Table II.

OUTPUT BUFFER ADDRESS GENERATION

Figure 3:
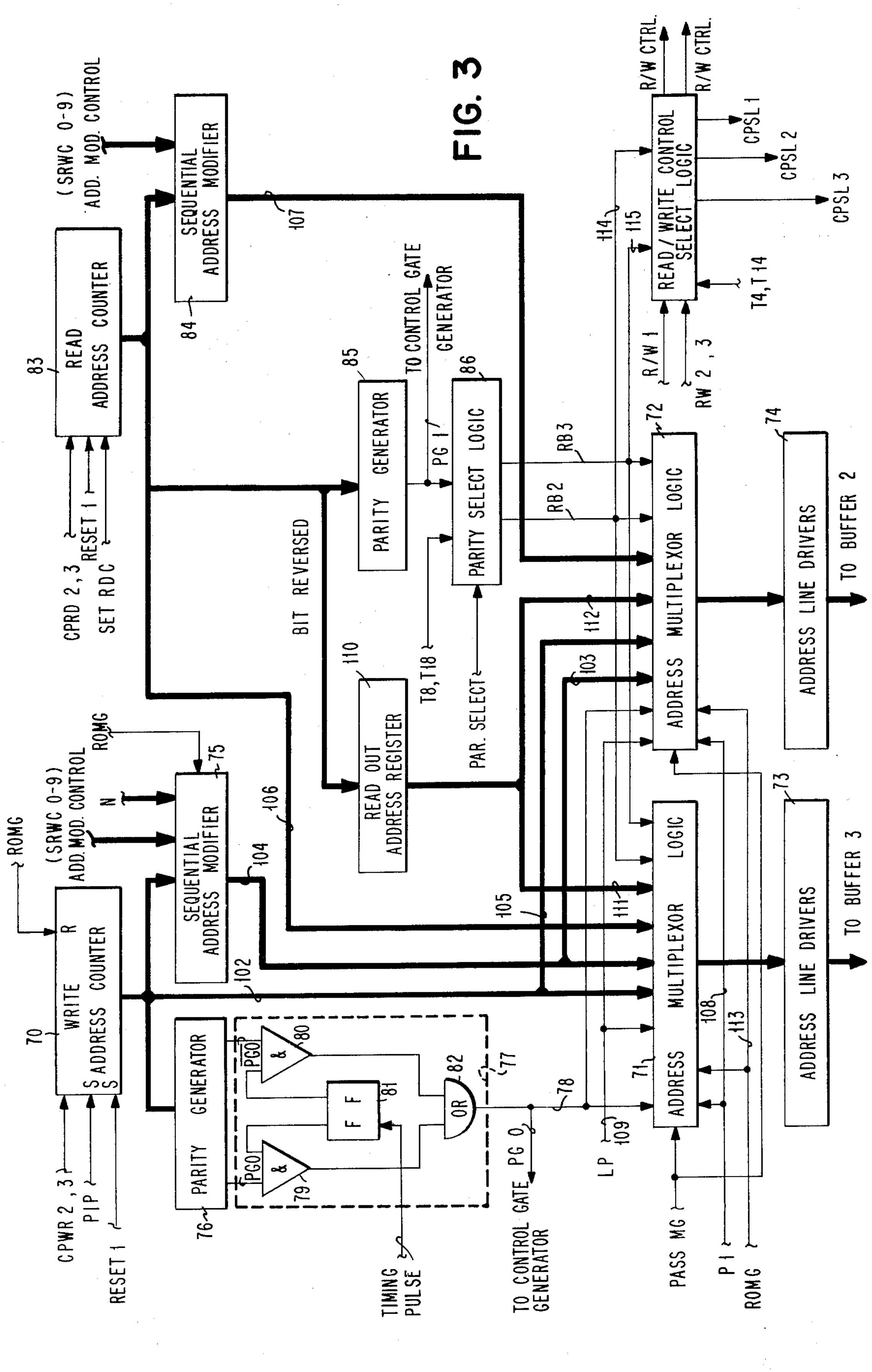
FIG. 3 is a detailed logic diagram of the buffer addressing system of the control unit of FIG. 1.

The address generation means of this invention comprises primary and complementary address generators having outputs connected to parallel address channels for simultaneously and selectively addressing line drivers, or the like, for output buffers 24 and 25. It is a feature of this invention that a single counter is the source means for both the primary and complementary addresses. In the preferred form of this invention, as shown in FIG. 3, for writing operand pairs into buffers 24 and 25, the primary address generation is a multistage write address counter 70 whose multibit output is connected to channel switching means such as address multiplexors 71 and 72, having output to address line drivers 73 and 74 for buffers 24 and 25. The output of write address counter 70 is also connected to an address modifier 75, which has output connections to each of the channel multiplexors 71 and 72. The address modifier 75 complements the primary address of the write address counter 70 in sequential manner as a function of the pass of the processor so that operand pairs are stored in complementary storage locations of buffers 24 and 25 in the order shown in Table II. The address multiplexors 71 and 72 operate as cross-switching circuits, that is, the primary and complementary addresses of the write address counter 70 and the address modifier 75 can be selectively switched to either address channel. In the preferred embodiment, selective cross-switching of addresses occurs in Pass 1, Pass 5 (LP) and in read out mode. The means for controlling the selective cross-switching in Pass 1 and LP is parity determining means comprising a parity generator 76 and parity select logic 71 which check the output of the write address counter 70 and generates a parity gate pulse (PG0) to the address multiplexors 71 and 72. (The PG0 pulses are also connected to control gate generator 45 and input and output switch gates 27 and 28 for data cross-switching control, as described hereinafter.) Parity generators 76 are well known in the art and essentially comprise logic circuitry which checks the number of ones in the address and generates a zero if an even number of ones are present or a one if an odd number is present. In the preferred embodiment, the parity generator 76 has complementary outputs PG0 and $\overline{PG0}$ which are connected to parity select circuitry 77 having a single output 78 connected to the multiplexors 21 and 22. Thus, when an even parity is present in the address of write counter 70, the PG0 and $\overline{PG0}$ signals may be up and down, respectively, and when odd parity exists, the reverse state of PGO and $\overline{PGO}$ is present at the parity select circuitry 77 which generates an up or down gate signal on output line to the multiplexors 71 and 72 to control the routing of the computed operands $A_r$ and $A_{r+n/2}$ to the buffers 24 and 25. A particular form of parity select logic 77 may comprise a pair of AND gates 79 and 80, respectively, connected to the PG0 and $\overline{PG0}$ lines of parity generator 76. A flip-flop (FF) 81 operated by timing pulses from the control pulse advance generator 46 generated during the write cycles of Pass 1 alternately gate the PG0 or $\overline{PG0}$ signals through OR gate 82 to the multiplexors 71 and 72.

A similar addressing scheme is provided for reading operand pairs from buffers 24 and 25. A single multistage binary read address counter 83 generates the primary address through address multiplexor 71 to buffer 25 and to a sequential address modifier 84 whose output is connected to address multiplexor 72 to buffer 24. A parity generator 85 and parity select logic circuit 86 are provided which function to determine which address multiplexor 71 and 72 is to gate the primary and complementary addresses to the line drivers 73 and 74. The parity generator 85 generates a PG1 output whose state changes for even-odd parity. The parity select circuit 86, as in the case of parity select 77 for the write operation, functions to generate read gate pulses RB2 and RB3 to address multiplexors 71 and 72, under the control of the time pulses (e.g., T8, T18) from central control unit 20.

Figure 8:
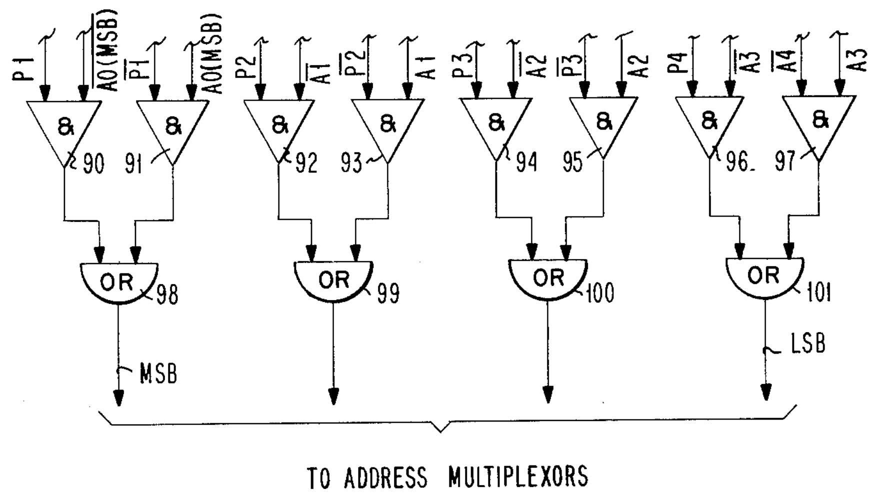
FIG. 8 is a detail of the Address Modification logic of the address generation of FIG. 3.

The address modifier circuits for read addressing and for write addressing are the same. As previously discussed, address modification is a function of the pass of the processor and modification is provided by sequentially complementing the primary address bits in descending order from the MSB to the LSB and in last pass being inactive. By way of illustration, one form of address modification is seen in FIG. 8 where pass pulses P1–P4 from pass-shift counter 47 (of FIG. 4) and their complements are fed with individual address pulses A0-A3 and the complements thereof from the read or write address counters 70 and 83 through a set of AND gates 90 and 97 connected through a set of OR gates 98–101 having outputs connected to multiplexors 71 and 76.

The operation of the address generation of FIG. 3 is as follows:

In Pass 1, computed operand pairs $A_r$ and $A_{r+n/2}$ from AU 21 of FIG. 1 are to be stored simultaneously in buffers 24 and 25, as shown in Table II. As seen in that Table, OP0 is to be placed in memory location 0 0 0 0 of buffer 24, and OP16 is to be placed in memory location 1 0 0 0 of buffer 25. Upon receipt of CPWR 2, 3 from control pulse advance generator 46 and pass P1 initiate pulse gate PIP pulses write counter 70 is set to address memory location 0 0 0 0. This output is applied simultaneously on lines 102 and 105 to address multiplexors 71 and 72. The write counter output is also connected to address modifier 75. In Pass 1, the MSB bit of the address 0 0 0 0 is complemented, thus modifying the address to 1 0 0 0. The modified address is applied simultaneously on lines 104 and 103 to multiplexors 71 and 72. Parity generator 76 checks address 0 0 0 0. Since the number of ones present in the address is zero, an equal PG0 pulse is generated and is gated by a timing pulse to FF 81 through OR gate 82 to give a zero pulse to both address multiplexors. With a Pass 1 gate pulse P1 present on line 108 to multiplexors 71 and 72, address 0 0 0 0 is now gated through multiplexor 71 to line drivers 73 to buffer 24 and address 1 0 0 0 is gated through multiplexor 72 to activate address line drivers 74 to memory location 1 0 0 0 of buffer 25. On the next write cycle, a second pair of operands OP1 and OP17 are received from AU 21 to be stored in memory position 0 0 0 0 of buffer 25 and memory position 1 0 0 0 of buffer 24, respectively. This requires gating the write address of write counter 70 to address multiplexor 72 and the complementary address of address modifier 75 to address multiplexor 71. Since the addresses of write counter 70 and address modifier 75 are already set, the output of parity select logic is changed from zero to one by the next time pulse synchronized with data flow from AU 21 causing FF 81 to gate $\overline{PG0}$ pulse through OR gate 80, thereby reversing the gates in the address multiplexors 71 and 72. For the next set of operand pairs, OP2 and OP18, the write address counter 70 is then incremented by the next CPWR 2, 3 pulse from the control pulse advance generator 46 changing the address from 0 0 0 0 to 0 0 0 1 which complemented is 1 0 0 1. This produces an odd parity signal from parity generator 76 and the parity select circuit 77 and causes OP2 to be switched through multiplexor 71 to be stored in memory location 0 0 0 1 of buffer 25 and OP18 to be switched through multiplexor 72 to be stored in memory position 1 0 0 1 of buffer 24. On the next time pulse to FF 81, the parity select signal is reversed to switch gate the address multiplexors 71 and 72 causing OP3 to be stored in buffer 24 position 0 0 0 1 and OP19 to be stored in position 1 0 0 1 of buffer 25. The write counter 70 is again incremented by CPWR 2, 3 pulse and the process repeated until all computer operand pairs of $A_r$ and $A_{r+n/2}$ from the AU 21 have been stored, as shown in Table II. Thus, it is seen that parity checking serves as the switching control means for addressing buffers 24 and 25.

Figure 9:
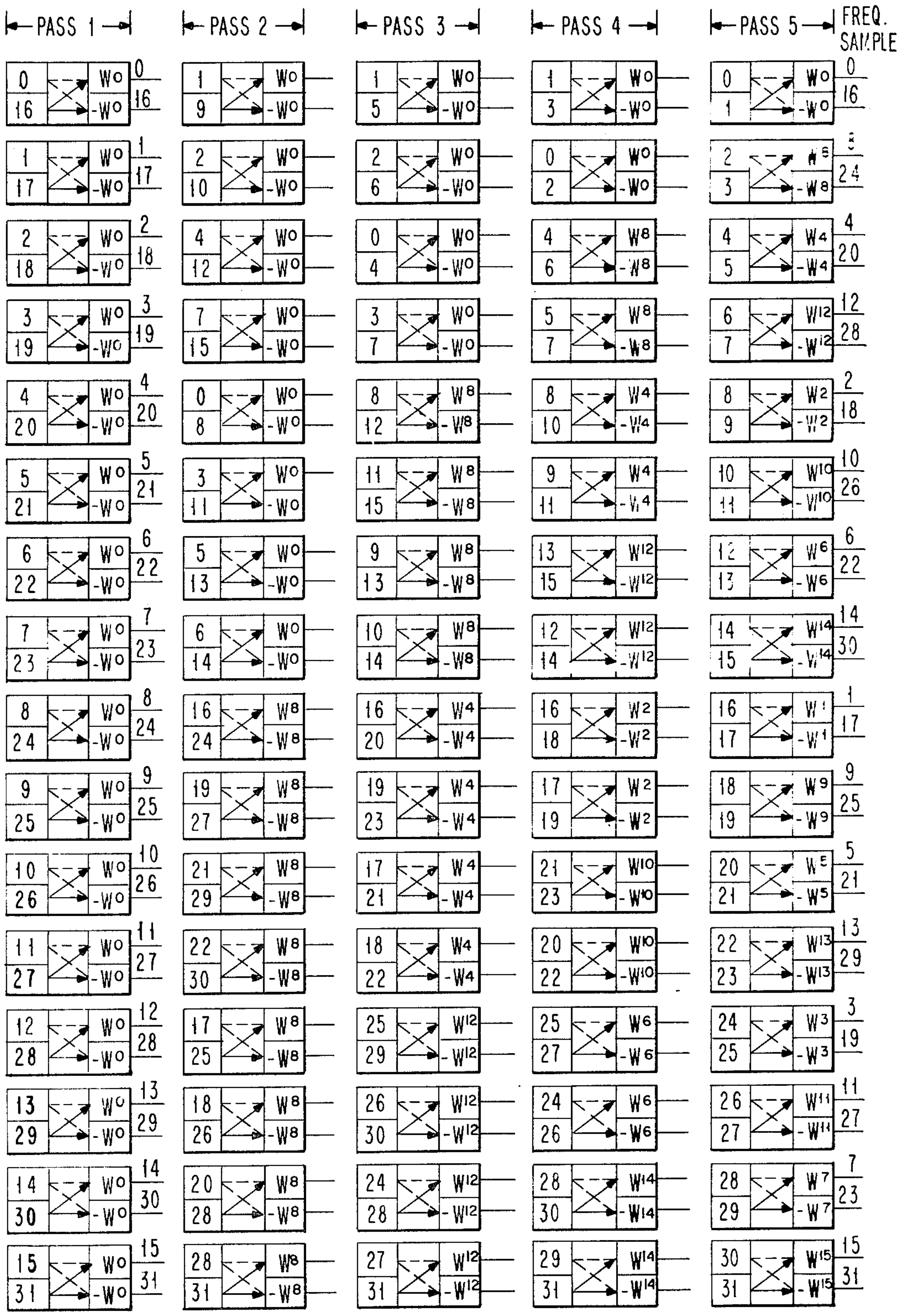
FIG. 9 is a graphical representation of the simultaneous mathematical operations sequence for the various operands and coefficients of the Cooley-Tukey algorithm as embodied in this invention.

On succeeding passes for processing the algorithm as shown in FIG. 9 and Table II, operand pairs are read from buffers 24 and 25 in synchronization with $W_r$ coefficients streamed through the AU 21 and stored into some positions of memory in the buffers. In these passes, read address counter 70 and its address modifier 84, and the write address counter 70 and its address modifier 75 are operated in step so that each generates the same address to assure that the retrieved operand pairs and the subsequent calculated operands pairs are returned to the same memory locations of the buffers.

At the end of Pass 1, a reset 1 pulse from pass counter 47 sets write address counter 70 and read address counter 83 to the same initial count condition. Thereafter, these two counters count in the same sequence for passes after Pass 1. In passes 2–4, read address from read counter 83 is connected via line 106 through multiplexor 71 and line drivers 73 to buffer 25, while the modified read address of address modifier 84 is connected via line 107 through multiplexor 70 and line drivers 74 to buffer 24. Thus, the addressing of buffers 24 and 25 by both read and write counters 70 and 83 coincide so that the calculated operand pairs from AU 21 are stored in the locations from which the operand pairs were retrieved to perform on an "in place" basis. While the read and write addressing is identical for the buffers 24 and 25, the timing is such that read out from one pair of memory locations of buffers 24 and 25 occurs in advance of the write operation and the read addresses are advanced while calculation occurs in the AU 21. The CPRD 2, 3 and CPWR 2, 3 pulses are timed to advance read counter 83 ahead of write counter 70 so that reading and writing are occurring in an overlap condition, the reading occurring preferably during the calculation step in AU 21 and writing occurring thereafter.

In the course of processing the algorithm for passes P2 to LP, the parity check and pulse generation continues. These pulses PG0 and PG1, while generated, do not gate address multiplexors 71 and 72 as for Pass 1 since the Pass 1 gate pulse P1 is no longer present on line 108 to the address multiplexor 71 and 72. The write counter 70 and read counter 83 address the same memory positions of buffers 24 and 25 for each read/write cycle. At the beginning of last pass, as previously described, address modifiers 75 and 83 become inactive and the write and read addresses of counters 70 and 83 are the same as the addresses of address modifiers 75 and 84. Thus, buffers 24 and 25 are being addressed simultaneously at the same memory positions as shown in FIG. 9 and table II for Pass 5. A last pass (LP) pulse on line 109 to address multiplexors 71 and 72 switches the write address and the complementary address to the same gates in both address multiplexors.

At the completion of the last pass, the computed coefficients are in scrambled condition. For external use, the computed data samples (i.e., the frequency coefficients) are required, in many applications, such as for displaying the sampled waveform, to be in order.

At completion of last pass, LP, the read out mode is initiated. In this mode, the frequency coefficients are to be read from buffers 24 and 25 in ascending order, i.e., $f_0, f_1$ - - - $f_3$. As seen in Table II, $f_0$ is stored in memory location 0 0 0 0 of buffer 24, $f_1$ is stored in memory location 1 0 0 0 of buffer 25, $f_2$ is stored in 0 1 0 0 of buffer 24, and $f_3$ in 1 1 0 0 of buffer 24. Likewise, $f_4$ is in 0 0 1 0 of buffer 25 and $f_5$ in 1 0 1 0 of buffer 25. Basically, the storage locations correspond to the bit reversed positions of the straight binary count sequence of read address counter 83. For that purpose, the output connections from read address counter 83 is bit reverse connected to read out address register 110 so that bit reversed addresses of counter 83 are gated from read out address register via lines 111 and 112 to address multiplexors 71 and 72 by a ROMG pulse on line 113 from the ROMG logic 54 (FIG. 4). In the read out mode, the parity determination means, comprising the parity generator 85 and parity select 86, produce buffer selection pulses RB2 and RB3 pulses on lines 114 and 115 to the address multiplexors 71 and 72. Thus, on read out mode addressing, read address counter 83 is cycled in a straight binary count, its address outputs are parity checked by parity generator 85 and bit reversed by the read out address register 110, then gated through address multiplexors 71 and 72 by parity bits RB2 and RB3 to provide frequency coefficient read out as shown in Table II. Since two frequency coefficients are stored at each memory location, the read out address counter 83 is cycled twice to perform a complete read out of all frequency coefficients. As previously mentioned, while the processing and read out modes are taking place, new data sets may be stored in input buffer 23 under control of input timing and input formatting and control unit CU 20. Thus, when read out mode is complete, the process is repeated by the generation of a Reset 4 pulse.

READ ONLY STORAGE (ROS) AND ADDRESS GENERATION

As previously discussed, in the processing mode, coefficients of unity $W_r$ are read out of ROS 26 in synchronization with read out of data from buffers 23, 24, and 25 during passes P1–5. The sequence of $W_r$ coefficients is seen by reference to FIG. 9. As seen there, in Pass 1 the coefficient is $W^0$; in Pass 2, the coefficients are $W^0$ and $W^8$; in Pass 3, the coefficient sequence is $W^0$, $W^8$, $W^2$, $W^{12}$; the Pass 4 sequence is the same as Pass 3, plus $W^2$, $W^{10}$, $W^6$, and $W^{14}$; and the Pass 5 sequence repeats the Pass 4 sequence and adds $W^1$, $W^9$, $W^5$, $W^{13}$, $W^3$, $W^4$, $W^7$, and $W^{15}$.

In the preferred embodiment for obtaining the above sequence of operations, $W_r$ coefficients are stored in ROS 26 in the numerical order of the coefficients, i.e., $W^0$ is stored in location 0 0 0 0 and $W^8$ is store in location 1 0 0 0. A binary counter 39 whose output is bit reversed, serves as the address input to the ROS. Incrementing the binary counter 39 every $n/2^P$ operations, where P equals the decode state of pass counter 47 assures that the correct coefficient will be available for a computation as shown in FIG. 9. As shown in FIG. 4, the ROS address logic comprises address counter 145 with bit reversed output, connected to a comparator, (RADD $n/4$) 146, a subtractor ($n/2$–RADD) 147, address select logic 148 and data translation means. Basically, select logic 148 is a switch gate designed to selectively gate output addresses from either ROS address counter 145 or subtractor 147 to the ROS address means 148 under control of comparator 146. For that purpose, comparator 146 has output connections 149, 150, and 151 which provide an equal (=) greater than (>) or less than (<) pulse to address select logic 148. Thus, if the comparison of the RADD from ROS address counter 145 is gated through address select logic 148 by a signal on line 151. If the RADD is equal to (=) or greater than (>) $n/4$, the modified address from subtractor 147 is gated through address select logic 148 by an equal signal (=) or a greater than pulse (>) on lines 149 and 150, respectively. Using the $n/4$ comparator 146 and $n/2$ – RADD subtractor 147 n roots of unity coefficients are available with only $n/4$ storage. The outputs from ROS address counter 145 address the first $n/4$ coefficients. The remaining coefficients are addressed by modified addresses from the $n/2$ – RADD subtractor.

The timing and control for the ROS counter 145 comprises a multistage shift register 46 and $n/8$ counter 55 inputted to comparator 57 whose output is connected to count 2 circuit 58 connected to select gate 59. This timing and control logic generates an increment pulse RCAP to the ROS address counter 145 each $n/2^P$ times for each pass. The ROS address counter 145 is reset by a Reset 1 pulse from OR gate 48.

At the beginning of the processing mode, shift register 56 is set to an $n/8$ count. In Pass 1, register 56 does not change state and no CGGR pulse will be generated since Pass 1 does not include read out of buffers 24 and 25, consequently, no CPRD 2, 3 pulses are spplied to $n/8$ counter 55. Also, in Pass 1, ROS address counter 145 is in zero state and its bit reversed output is 0 0 0 0. Comparator 146 generates a less than (<) pulse on line 151 to address select logic 148 thereby gating the zero address to ROS addressing which reads out $W^0$ from location 0 0 0 0. Since no CGGR or RCAP pulses are generated from timing and control, ROS address counter 145 remains in the zero state throughout Pass 1, thereby reading $W^0$ out of ROS 26 for the entire pass is required by FIG. 9. In Pass 2, data is read out of buffers 24 and 25, thereby CPRD 2, 3 pulses from pulse advance generator 46 will increment $n/8$ counter 55. When counter 55 is incremented to the level of shift register 56, an equal condition in comparator 57 generates a CGGR pulse which resets counter 55 for second count cycle. Thus, for $n =$ 32, shift register 56 is set at a four state and comparator 57 will generate a CGGR pulse every four read operations of Pass 2. At the end of the second four count by $n/8$ counter 55, a second CGGR pulse advances count 2 circuit 58 and a RCAP from gate 59 increments the ROS address counter 145 one count. The RADD, bit reversed, is 1 0 0 0, thus, comparator 146 generates a greater than (>) pulse on line 150 which switches address 1 0 0 0 from subtractor 147 through address select logic 148 to address location 1 0 0 0 of ROS 26. As previously described, a $W^8$ coeffieicnet will be read out of ROS 26 at end of eight read operations of buffers 24 and 25, thereby corresponding to the processing sequences of Pass 2, as shown in FIG. 8. A second RCAP is not generated during Pass 2, therefore, ROS address counter 145 is not incremented although two more CGGR pulses will be generated to reset $n/8$ counter 55 due to the fact that pass two terminates when comparator 49 generates an equal compare pulse when write address counter 70 and ($n/2$ –2) generator 50 are equal to cause reset 1 latch to send a reset 1 pulse from OR gate 48. Thus, ROS address counter 145 is reset to zero at the end of Pass 2 to begin the next addressing sequence for Pass 3.

At the beginning of Pass 3, shift register 56 at P3 pulse from pass shift counter 47, thereby advancing the state of register 56 from $n/8$ to $n/16$. Thus, where $n = 32$, comparator 57 generates a CGGR pulse to count 2 circuit every two read clock pulses CPRD 2, 3 and a RCAP pulse increments ROS address counter every four read operations. Thus, the initial address of ROS counter 145 is switched from 0 0 0 0 to 1 0 0 0 at the end of four read operations to read out $W^0$ and $W^8$, as previously described. At the end of eight read operations, a third RCAP pulse increments ROS counter 145 to a bit reversed state of 0 1 0 0. Comparator 146 generates an equal (=) pulse on line 149, thereby gating address 0 1 0 0 from subtractor 147 through address select logic 148 to address location 0 1 0 0 of ROS to read out coefficient $W^4$. This process is repeated after another four operations and a $W^{12}$ is read from ROS 26 whereupon the reset 1 latch 51 generates a Reset 1 pulse through OR gate 48 resetting ROS counter 145 to zero and advancing shift register 56 to $n/32$ state. In Pass 4, comparator 57 generates a CGGR pulse every read operation and count 2 circuit 58 generates a RCAP pulse through select gate 59 every second read operation, thus read out unity coefficients $W^0$, $W^8$, $W^4$, $W^{12}$, etc., every two operations as indicated. For last Pass LP, ROS counter 145 is incremented every read operation. Thus, on LP gate pulse to select gate 59 causes CPRD 2, 3 pulses to produce RCAP pulses every read operation so $W^0$, $W^8$, etc., coefficients are read out every read operation in the sequence described.

INPUT AND OUTPUT GATE SWITCHING

As shown in FIG. 9, and referring to Table II, it will be seen that the operands in buffers 24 and 25 during passes 2–4 require cross switching through input and output gate switches 27 and 28. The mathematical basis for this is more fully explained in the previously mentioned article of Brigham et al. Basically, the operands stored in buffers 24 and 25 after Pass 1 are read out selectively to the $B_r$ or $C_r$ sides of the input gates 27 in a predetermined sequence. Referring again to FIG. 9 and Table II, in Pass 2, the first four operations require operands OP1, OP2, OP4 and OP7 to be gated from buffer 25 to $B_r$ inputs of AU 21. Likewise, OP9, OP10, OP12, and OP15 are required to be gated from buffer 24 to $C_r$ input of AU 21. For the next four operations, OP0, OP3, OP5 and OP6 are required to be gated from buffer 24 to the $B_r$ input of AU 21 while OP8, OP11, OP13, and OP14 are gated from buffer 24 to $C_r$ input of AU 21. Thus, in Pass 2, the input switch gate 27 is cross switched every four operations. Likewise, cross switching occurs in Pass 3 and 4 operations. From the FIG. 9, it will be seen that cross switching of input and output gates 27 and 28 occurs during Pass 2–4 every $n/s^{P+1}$ operations. In accordance with the practice of this invention, there-fore, the cross switching is controlled by the CGGR pulse generated by the comparator 57 every $n/2^{P+1}$. Thus, a common gate generation is used for addressing ROS 26 and for cross-switching, thereby assuring the reliable and synchronous gating of the operand pairs and $W_r$ to the AU 21 for simultaneous calculations of $A_r$ and $A_{r+n/2}$.

Figure 10:
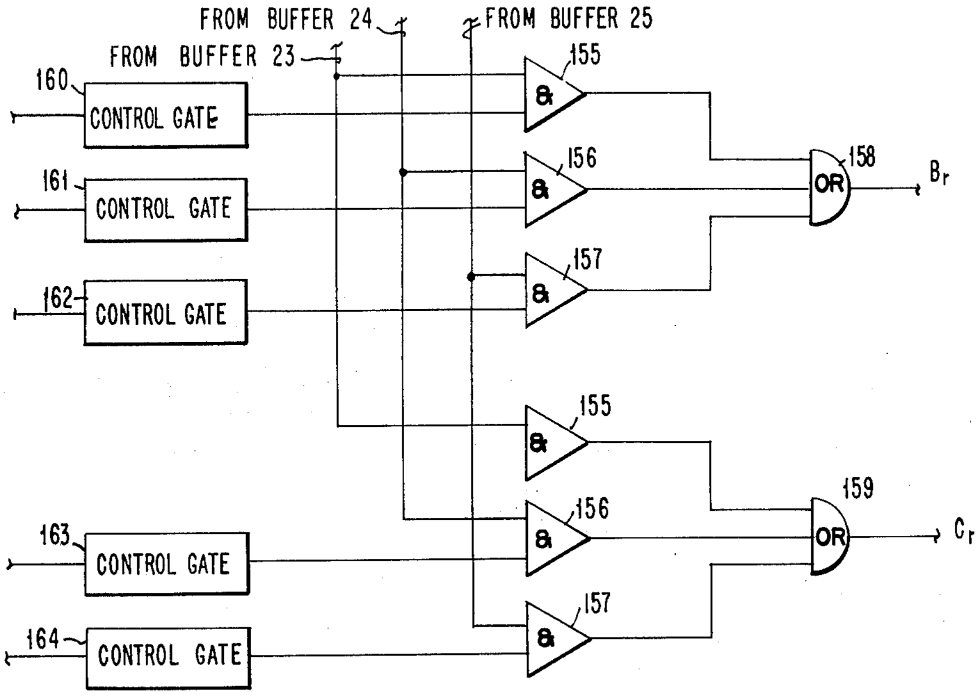
FIG. 10 is a schematic diagram of input gate switches of FIG. 1.

A cross switch logic arrangement may take various forms. As shown in FIG. 10, a logic gating network comprises AND gates 155, 156, and 157 connected to data inputs from buffer 23, 24, and 25 and to OR gates 158 and 159 for connection to input buffer registers of AU 21. In Pass 1, no cross switching occurs so that a Pass 1 pulse to control gate 160 generates a gate pulse to AND gates 155 whereby input operand data flows directly through OR gates 158 and 159 to the appropriate input buffer registers (130–133 FIG. 5) of AU 21. During Pass 2–4, however, cross switching is required, as previously described. For this purpose, AND gates 156 are connected to buffer 24 and AND gates 157 are connected to data channels of buffer 25. Load $B_r$ from buffer 2, 3 and Load $C_r$ from buffer 2, 3 signals from control gate generator 45 (FIG. 3) are selectively applied to control gates 161–164 to selectively flow operand data from buffers 24 and 25 through AND gates 156 and 157 through OR gates 158 and 159 to the input buffer registers 130–133 of AU 21. The selective switching of the loading signals to control gates 161–164 occurs under CGGR pulse from comparator 57 (FIG. 4) as applied to control gate generator 45. Thus, in Pass 2, as previously described, a first CGGR pulse is generated at the end of the first four read operations. When this occurs, the load $B_r$ from buffer 2, 3 signal is switched from control gate 163 to control gate 161 and the load $C_r$ from buffer 2, 3 signal is switched to control gate 164 from control gate 162 to cross switch the data channels from buffers 24 and 25. The cross-switching of the above-mentioned load signals each time a CGGR pulse is applied to control gate generator 45 coincidentally with pass pulses P2–4.

Figure 11:
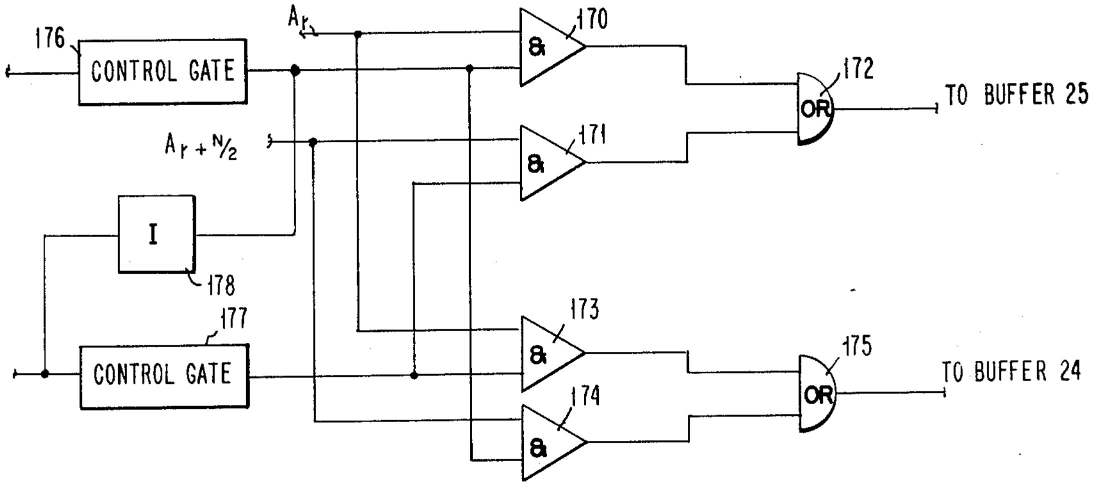
FIG. 11 is a schematic diagram of output gate switches of FIG. 1.

As seen in FIG. 11, an output cross switching arrangement comprises AND gates 170 and 171 having inputs connected to $A_r$ and $A_{r+n/2}$ channels of AU 21 and outputs connected to OR gate 172 to buffer 25. Likewise, AND gates 173 and 174 are connected to channels $A_r$ and $A_{r+n/2}$ of AU 21 and their outputs connected through OR gate 175 to buffer 24. Control gate 176 has output connections to AND gates 170 and 174 to gate $A_r$ into buffer 25 and $A_{r+n/2}$ into buffer 24. Control gates 176 and 177 operated by a load buffer 2, 3 signal from control gate generator 45 has outputs connected to AND gates 171 and 173 for gating $A_{r+n/2}$ to buffer 25 and $A_r$ to buffer 24. As in the case of input gate cross-switching, the output gate switching occurs on generation of CGGR pulses from comparator 57 (FIG. 3) in coincidence with P2–4 pulses applied to control gate generator 45 to selectively apply load buffer 2, 3 signals to control gates 176 and 177, thereby assuring that operands crossed to input switch gates 27 are re-cross switched to return their computed operands to the "in place" location of buffers 24 and 25. On completion of Pass 4, cross switching of data channels is no longer required and addressing of data in buffers 24 and 25 is under control of parity generators 76 and 85, as previously described.

While the invention has been particularly shown and described with reference to a preferred embodiment thereof, it will be understood by those skilled in the art that various changes in form and details may be made therein without departing from the spirit and scope of the invention.

We claim:

1. A fast Fourier transform digital processor for processing waveform samples according to the Cooley-Tukey algorithm comprising in combination:

a digital calculator operable for simultaneously calculating the equations $A_r = B_r + W_r C_r$ $A_{r+n/2} = B_r - W_r C_r$ where $A_r$, $B_r$, $C_r$ and $W_r$ are complex factors of said algorithm, said calculator having parallel output data channels;

storage means connected to said data channels for storing sets of operands calculated by said calculator; and control means operatively connecting said calculator, said data channels and said storage means for controlling the storing of said operands by pairs produced by said calculator including addressing means selectively operable for simultaneously addressing predetermined sequences of paired storage locations of said storage means.

2. A fast Fourier transform digital processor in accordance with claim 1 in which said addressing means includes:

means for generating a first storage address;

means for generating a second storage address by complementing said first address; and means for simultaneously switching said first and second addresses to predetermined paired locations of said storage means.

3. A fast Fourier transform digital processor in accordance with claim 2 in which said storage means for calculated operands comprise dual storage devices; and said addressing means includes means for simultaneously addressing said first address location in one of said storage devices and said second address location in the other of said storage devices.

4. A fast fourier transform digital processor in accordance with claim 3 in which said addressing means further includes means for determining the parity of the address of said first address means; and means responsive to a parity determination for selectively controlling the sequential switching of said first and second addresses to said predetermined paired locations of said storage devices.

5. A fast Fourier transform digital processor in accordance with claim 3 in which said control means further includes means for reverse switching said first and second addresses for reverse pairing of said addresses of said storage devices for successive pairs of operands.

6. A fast Fourier transform digital processor in accordance with claim 2 in which said first address generator comprises binary counter means;

said second address generator comprises means for complementing the address of said binary counter means to produce said second address.

7. A fast Fourier transform digital processor in accordance with claim 6 in which said address switch means comprises first and second address multiplexors;

said first and second address generators being connected to said first and second address multiplexors for addressing said first and second storage devices; and means for selectively gating addresses simultaneously through said multiplexors from said first and second address generators to paired storage locations of said first and second storage devices.

8. A fast Fourier transform digital processor in accordance with claim 7 in which said selective gating means includes means for determining the parity of the binary address of said counter means; and means responsive to a parity signal from said parity determining means for selectively gating said first and second addresses to paired locations in said storage devices.

9. A fast Fourier transform digital processor in accordance with claim 8 in which said selective gating means further includes means for switching the parity signal responsive means to reverse the selective gating of said first and second addresses to corresponding paired storage locations in said storage devices.

10. A fast Fourier transform digital processor for processing waveform samples according to the Cooley-Tukey algorithm comprising in combination:

a digital calculator for simultaneously performing the calculation of the equations $A_r = B_r + W_r C_r$ and $A_{r+n/2} = B_r - W_r C_r$;

where $A_r$, $B_r$, $C_r$, and $W_r$ are complex factors of said algorithm;

means for supplying various roots of the unity coefficient $W_r$ to said calculator;

means for supplying a set of digital operands of a sampled waveform in predetermined order and sequence by operand pairs to said digital calculator in synchronism with the supply of said unity coefficient $W_r$;

means for storing a set of operands processed by said calculator in performance of said simultaneous calculations; and control means operatively connected to said calculator, said coefficient supply means, said operand supply means, and said operand storage means for streaming said set of sampled waveform and calculated operands simultaneously by operand pairs in a plurality of successive passes through said calculator in synchronism with selectively varied roots of said unity coefficients and simultaneously restoring in said storage means by operand pairs the successively derived sets of operands produced by said calculator;

said control means further including means for selectively ordering said operand pairs and said roots of the unity coefficient $W_r$ as a function of the pass of said sets operand data through said calculator.

11. A fast Fourier transform digital processor in accordance with claim 10 in which said storing means comprises dual storage devices operatively connected to said calculator to store calculated operand sets generated by said calculator;

said means for streaming operand pairs of said operand sets includes means for simultaneously addressing paired storage locations in said dual storage devices in a predetermined sequence of paired addresses for each pass; and said means for selectively ordering said operand pairs in said predetermined sequence for streaming operand pairs through said calculator and to said storage devices includes control means for determining the pass condition of said calculator and means responsive to the pass determining means for selectively altering the simultaneously paired addressing sequences of said addressing means.

12. A fast Fourier transform digital processor in accordance with claim 11 in which said simultaneous addressing means comprises binary count means for generating a first storage location address;

means for complementing said storage location address of said binary count means for generating a second complementary storage location address paired with said first address; and means for selectively controlling the complementary addressing means as a function of the pass of said processor for ordering the operand pairs of said operand sets.

13. A fast Fourier transform digital processor in accordance with claim 12 in which said binary count means includes a multistage binary counter and means for incrementing said binary counter in ascending numerical order each pass of said processor and said complementary address means includes means for complementing said first binary address in descending order by bit as a function of the pass of said processor.

14. A fast Fourier transform digital processor in accordance with claim 13 in which said address generation means comprises:

write address generation means for simultaneously addressing paired storage locations of said dual storage devices;

read address generation means for simultaneously addressing paired storage locations of said dual storage devices; and control means for selectively operating said write and read address generation means sequentially to order the simultaneous addressing of said dual storage devices in an "in place" operation of said processor.

15. A fast Fourier transform digital processor in accordance with claim 14 in which said write and read addressing means comprise binary count means and complementing means operatively interconnected for generating primary and complementary storage addresses, respectively; and said control means includes means for selectively operating said count and said complementing means in timed relation with the operation of said processor.

16. A fast Fourier transform digital processor in accordance with claim 15 in which said supply means for said $W_r$ coefficient is a read only storage device in which said unity coefficients are stored in locations in which the storage address corresponds with the numerical root designation of said coefficient.

17. A fast Fourier transform digital processor comprising, in combination:

a digital calculator capable of simultaneously calculating the equations:

$$A_r = B_r + W_r C_r \qquad (1)$$

$$A_{r+n/2} = B_r - W_r C_r \qquad (2)$$

where $A_r$, $B_r$, $C_r$, and $W_r$ are complex factors of the Cooley-Tukey algorithm;

said calculator having parallel operand and coefficient input data channels and parallel operand output data channels;

dual storage devices for storing operand data generated by said calculator;

output switch means connecting said output operand data channels to said storage device;

storage means for $n/4$ roots of the unity coefficient $W_r$;

input switch means respectively connecting said dual storage devices to said operand input data channels and said coefficient storage means to said coefficient input data channel;

control means operatively connecting said calculator, said coefficient and said operand storage devices for cycling a set of operand data from said storage device with coefficient data from said storage means through said calculator in a series of passes including means for controlling the input switch means for simultaneously switching operand data by operand pairs from said storage devices to said operand input channels of said calculator and for switching coefficient data from said storage means to said coefficient channel of said calculator; and means for controlling the output switch means of said output channels for simultaneously restoring computed operand pairs from said calculator into said dual storage devices.

18. A fast Fourier transform digital processor in accordance with claim 17 in which said control means includes means for simultaneously cross switching operand data pairs from said operand data storage devices to the operand data channels in predetermined sequences as a function of the pass of said processor.

19. A fast Fourier transform digital processor in accordance with claim 18 in which said control means includes means for altering the sequence of cross switching of said operand pairs to said operand channels as a function of the pass of said processor.

20. A fast Fourier transform digital processor in accordance with claim 19 in which said control means further includes means for altering the ordering of roots of the unity coefficient switched to said $W_r$ input channel as a function of the pass of said processor.

21. A fast Fourier transform digital processor in accordance with claim 20 in which said control means for alterably cross switching the operands to said operand input channels from said dual storage device and for switching said roots of unity of said coefficient $W_r$ to said coefficient input channel includes:

means for generating a first switch control pulse every $n/2^P$ times in a pass and a second switch control pulse every $n/2^{P+}$ times in a pass where $n$ equals the number of data operand pairs being processed in a pass by said processor and $p$ equals the number of the pass.

* * * * *

PO-1050 (5/69)

UNITED STATES PATENT OFFICE
CERTIFICATE OF CORRECTION

Patent No. 3,673,399 Dated June 27, 1972

Inventor(s) Peter J. Hancke, Monroe Judkovics and Robert J. Urquhart

It is certified that error appears in the above-identified patent and that said Letters Patent are hereby corrected as shown below:

Abstract, cover sheet, the formula reading $$A_{(r \, ^{+} n/2)} = B_r - W_r C_r$$

should read $$A_{(r+n/2)} = B_r - W_r C_r$$

Column 3, line 54, delete "Logic"; line 73, Table I, Pass 1, "OP." should read --OP0--. Column 5, Table III, lines 62 and 63, the two columns of numbers should be on the same line. Column 6, Table III, line 10, under "Output of Sequential Complementing Logic" the formula reading $$a_3 a_2 a_1 a_0$$

should read $$a_3 a_2 \overline{a_1} a_0$$

Column 6, Table III, line 11, under "Output of Sequential Complementing Logic" the formula reading $$a_3 a_2 a_1 a_0$$

should read $$a_3 a_2 a_1 \overline{a_0}$$

Claim 10, column 17, line 75, before "operand" insert --of--. Claim 21, column 20, line 20, the formula reading $n/2^{P+}$ should read $n/2^{P+1}$ Signed and sealed this 6th day of March 1973.

(SEAL)
Attest:

EDWARD M. FLETCHER, JR.
Attesting Officer

ROBERT GOTTSCHALK
Commissioner of Patents